(12) United States Patent
Park et al.

(10) Patent No.: US 9,325,668 B2
(45) Date of Patent: *Apr. 26, 2016

(54) SYSTEM FOR SUPPORTING OVER-THE-AIR SERVICE AND METHOD THEREOF

(75) Inventors: Young Chual Park, Yongin (KR); Tae Joon Yang, Seongnam (KR); Ki Jeong Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 1074 days.

This patent is subject to a terminal disclaimer.

(21) Appl. No.: 12/666,170

(22) PCT Filed: Jun. 18, 2008

(86) PCT No.: PCT/KR2008/003440
§ 371 (c)(1),
(2), (4) Date: Aug. 20, 2010

(87) PCT Pub. No.: WO2009/002041
PCT Pub. Date: Dec. 31, 2008

(65) Prior Publication Data
US 2011/0007899 A1 Jan. 13, 2011

(30) Foreign Application Priority Data
Jun. 22, 2007 (KR) .................. 10-2007-0061685

(51) Int. Cl.
*H04L 9/00* (2006.01)
*H04L 29/06* (2006.01)
*H04W 4/00* (2009.01)

(52) U.S. Cl.
CPC ........... *H04L 63/0428* (2013.01); *H04W 4/001* (2013.01)

(58) Field of Classification Search
CPC ...................... H04W 4/001; H04L 63/0428
USPC ............ 380/270, 44, 278, 255, 379, 45, 281; 713/160, 171; 726/6, 9; 455/414.1
See application file for complete search history.

(56) References Cited

U.S. PATENT DOCUMENTS 5,745,571 A 4/1998 Zuk
5,923,884 A * 7/1999 Peyret et al. .................. 717/167
(Continued)

FOREIGN PATENT DOCUMENTS

EP 1195965 A2 4/2002
JP 10-215244 A 8/1998
(Continued)

OTHER PUBLICATIONS

International Search Report for PCT/KR2008/003440 filed Jun. 18, 2008.
(Continued)

*Primary Examiner* — Mohammad A Siddiqi
(74) *Attorney, Agent, or Firm* — IP Legal Services, LLC

(57) ABSTRACT

Disclosed herein is a system and method for providing Over-The-Air (OTA) service. The system according to the present invention includes an OTA server for, when OTA data is requested by a mobile terminal, encrypting the requested OTA data using a preset OTA key depending on the type of the requested OTA data, and creating a message for providing the encrypted OTA data; and a message center for receiving the created message, and sending the created message to the mobile terminal.

12 Claims, 3 Drawing Sheets

(56) References Cited

U.S. PATENT DOCUMENTS

| | | | |
|---|---|---|---|
| 6,023,689 A * | 2/2000 | Herlin et al. | 705/67 |
| 6,216,014 B1 | 4/2001 | Proust et al. | |
| 6,367,014 B1 | 4/2002 | Proust et al. | |
| 6,385,723 B1 | 5/2002 | Richards | |
| 7,103,778 B2 * | 9/2006 | Kon et al. | 713/185 |
| 7,181,017 B1 * | 2/2007 | Nagel et al. | 380/282 |
| 7,352,868 B2 * | 4/2008 | Hawkes et al. | 380/281 |
| 7,392,377 B2 * | 6/2008 | Ogg et al. | 713/153 |
| 7,590,243 B2 * | 9/2009 | Kahn et al. | 380/239 |
| 7,715,822 B2 * | 5/2010 | Semple et al. | 455/411 |
| 2003/0224823 A1 * | 12/2003 | Hurst et al. | 455/558 |
| 2004/0030906 A1 | 2/2004 | Marmigere et al. | |
| 2004/0131185 A1 | 7/2004 | Kakumer | |
| 2004/0240671 A1 | 12/2004 | Hu et al. | |
| 2006/0196931 A1 | 9/2006 | Holtmanns et al. | |
| 2006/0291662 A1 | 12/2006 | Takahashi et al. | |
| 2007/0259647 A1 * | 11/2007 | Lee et al. | 455/410 |
| 2007/0276765 A1 * | 11/2007 | Hazel et al. | 705/71 |
| 2007/0288752 A1 * | 12/2007 | Chan | 713/171 |
| 2008/0292101 A1 * | 11/2008 | Macchi | 380/270 |
| 2009/0067367 A1 * | 3/2009 | Buracchini et al. | 370/328 |
| 2011/0167264 A1 | 7/2011 | Takahashi et al. | |

FOREIGN PATENT DOCUMENTS

| | | |
|---|---|---|
| JP | 2000-510977 A | 8/2000 |
| JP | 2001-118042 | 4/2001 |
| JP | 2001-510970 A | 8/2001 |
| KR | 1019990038700 A | 6/1999 |
| KR | 1020040036402 A | 4/2004 |
| WO | 97/44762 A1 | 11/1997 |

OTHER PUBLICATIONS

Wolfgang Rank et al., "Smart Card Handbook—13.2 The GSM System", Dec. 1, 2003, pp. 735-789.

European Patent Office, European search report of EP Patent Application No. 08766401.7, Nov. 14, 2014.

* cited by examiner

SYSTEM FOR SUPPORTING OVER-THE-AIR SERVICE AND METHOD THEREOF

TECHNICAL FIELD

The present invention relates to a system and method for providing Over-The-Air (OTA) service.

BACKGROUND ART

In general, OTA service denotes a general type of wireless communication service which sends information as requested by the users of mobile terminals. That is, OTA service is a service in which an OTA server sends information to a mobile terminal when a user requests information from the OTA server.

A mobile terminal installs terminal information related to mobile terminal or applications (hereinafter 'applets') corresponding to various types of additional services in a smart cards and then uses these. Since smart cards can store and process a large amount of information and provide excellent security, the necessity for smart cards is gradually increasing. For example, smart cards can be used in the financial, communication, medical, security and broadcasting fields.

Here, smart cards may be generally classified into the following three types depending on their functions and internal structures. That is, smart cards may include 1) memory-type smart cards in which microprocessors are not embedded, 2) smart cards in which microprocessors are embedded, and 3) interactive smart cards in which applications are installed and which are capable of the bi-directional transmission of information.

Such smart cards are used separately for their respective purposes, and are provided with data corresponding to terminal information or an applet via a Short Message Service (SMS) message. Accordingly, there is a data transmission capacity problem, for example, only data of a maximum size of 180 bytes can be sent, and thus currently it is possible to send only a small amount of data.

As a countermeasure against this problem, a method of transmitting OTA data through a Virtual Machine (VM) and a browser has been proposed. However, this method also has a problem in that OTA data can be received only when access to the wireless Internet has been made.

As a result, research into a system and method for providing OTA service that enables various types of OTA data to be transmitted and installed or stored in a single smart card must be continuously conducted.

DISCLOSURE

Accordingly, the present invention has been made keeping in mind the above problems occurring in the prior art, and an object of the present invention is to provide a system and method for providing OTA service which enables OTA data to be encrypted and decrypted using preset OTA keys depending on the type of OTA data, thereby enabling various types of OTA data to be installed or stored in a single smart card.

Another object of the present invention is to provide a system and method for providing OTA service, which enables various types of OTA data to be installed or stored in a single smart card capable of operating in conjunction with various types of mobile terminals, thereby providing improved convenience to users who use such smart cards.

In order to achieve the above objects, according to an aspect of the present invention, there is provided a system for providing OTA service, including an OTA server for, when OTA data is requested by a mobile terminal, encrypting the requested OTA data using a preset OTA key depending on the type of the encrypted OTA data, and creating a message for providing the requested OTA data; and a message center for receiving the created message, and sending the created message to the mobile terminal.

According to another aspect of the present invention, there is provided a smart card, including a first processing unit for receiving OTA data from a mobile terminal, decrypting the received OTA data using a first type of OTA key, and determining whether to process a first type of extracted OTA data; and a second processing unit for receiving the first type of OTA data depending on results of the determination, decrypting the first type of OTA data using a second type of OTA key, and processing a second type of extracted OTA data.

According to still another aspect of the present invention, there is provided a method of providing OTA service, including, checking the type of the OTA data when OTA data is requested by a mobile terminal; encrypting the OTA data using a preset OTA key and then creating a message for providing the encrypted OTA data depending on results of the determination; and sending the created message to the mobile terminal.

According to still another aspect of the present invention, there is provided a method of providing OTA service, including, decrypting the OTA data using a first type of OTA key when OTA data is received from a mobile terminal, and determining whether to process a first type of extracted OTA data; and decrypting the first type of OTA data using a second type of OTA key depending on results of the determination, and then processing a second type of extracted OTA data.

DESCRIPTION OF REFERENCE NUMERALS OF PRINCIPAL ELEMENTS IN THE DRAWINGS

Figure 1:
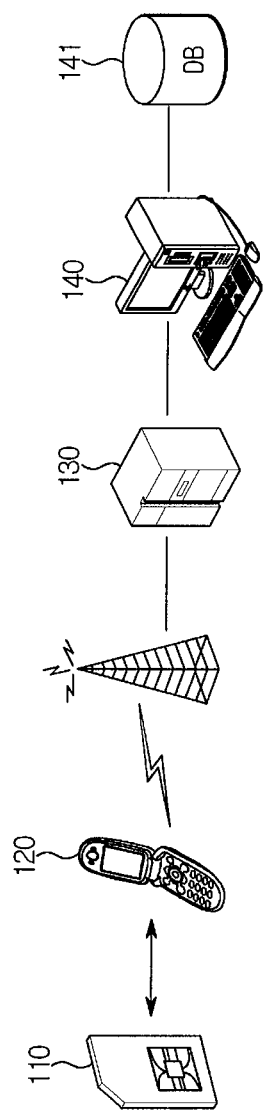
FIG. 1 is a diagram showing an example of the schematic construction of a system according to an embodiment of the present invention.

110: smart card
120: mobile terminal
130: message center
140: OTA server
141: database
310: first storage unit
320: second storage unit
330: first processing unit
340: second processing unit
350: ROM (Read Only Memory)
360: RAM (Random Access Memory)
370: interface

MODE FOR INVENTION

A system and method of providing OTA service according to an embodiment of the present invention will be described in detail below with reference to FIGS. 1 to 4.

The present invention proposes a method of constructing a USIM/SIM Application Toolkit (USAT) framework and a Global Platform (GP) framework in a smart card and installing or storing various types of OTA data in the smart card via the frameworks. That is, the present invention enables all services, including financial services such as mobile banking, stock trading and a credit card service, daily life infrastructure services such as a traffic card service and an ID card service, and other services such as a broadcasting service and a communication service, to be incorporated into a single smart card.

For this purpose, the present invention proposes the setup of OTA keys in the respective frameworks to grant processing rights for various types of OTA data.

Accordingly, the present invention allows for the provision of OTA data, for example, a mobile application which requires a large amount of data, via Multimedia Message Service (MMS) messages. Here, a mobile application may refer to a program that is downloaded to a mobile terminal, and is independently executed and used.

FIG. 1 is a diagram showing an example of the schematic construction of a system according to an embodiment of the present invention.

As shown in FIG. 1, the OTA service system according to the present invention may include a smart card 110, a mobile terminal 120, a message center 130, an OTA server 140, and a database 141.

OTA data, such as various types of terminal information related to mobile terminal and mobile applications (hereinafter 'applets') corresponding to various types of additional services, for use in the financial, communication, medical, security and broadcasting fields, may be installed in the smart card 110. The mobile terminal 120, which operates in conjunction with the smart card 110, may use the OTA data installed in the smart card 110.

In this case, the smart card 110 may refer to any one of a Subscriber Identification Module (SIM) card, a Universal Subscriber Identification Module (USIM) card, a User Identification Module (UIM) card and a Removable User Identification Module (RUIM) card, which may be installed in or detachably attached to the mobile terminal 120.

The OTA server 140 may create a message, including OTA data. The OTA server 140 may provide the created message to the mobile terminal 120 through the message center 130.

The database 141 may assemble and manage OTA data to be installed or stored in the smart card 110.

The message center 130 may send a message including OTA data. For example, the message center 130 may be any one of a Short Message Service Center (SMSC), a Long Message Service Center (LMSC) and a Multimedia Message Service Center (MMSC).

Figure 2:
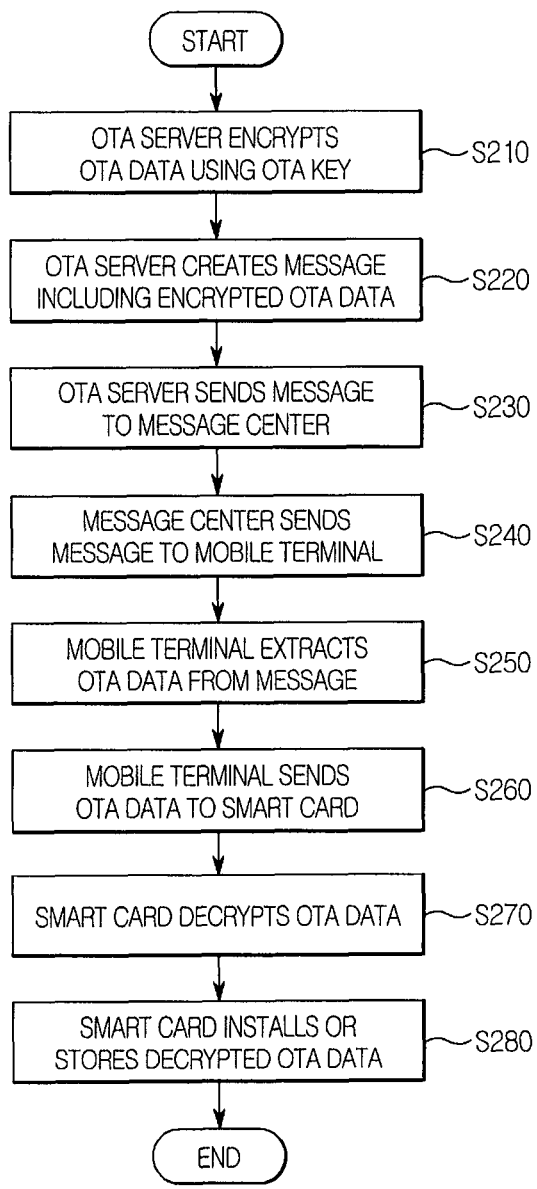
FIG. 2 is a first flowchart showing a method of providing OTA service according to an embodiment of the present invention.

FIG. 2 is a first flowchart showing a method of providing OTA service according to an embodiment of the present invention.

As shown in FIG. 2, when a user requires OTA data, the mobile terminal may request the OTA data from the OTA server. The OTA server may check the type of requested OTA data, that is, whether the requested OTA data is a first type of OTA data corresponding to mobile terminal-specific terminal information or a second type of OTA data corresponding to additional service-related information.

The OTA server may search the database for the OTA data. The OTA server may encrypt found OTA data using a preset OTA key at step S210. The OTA server may create a message including the encrypted OTA data at step S220.

In this case, the OTA server may encrypt the OTA data using a preset OTA key depending on the type of OTA data.

Such OTA keys for encrypting OTA data may include a first type of OTA key that is used for terminal information related to mobile terminal such as an authentication value for the authentication of a mobile terminal, a phone book, and a language for the setting of the mobile terminal, and a second type of OTA key that is used for service information related to additional service such as an applet for the use of an additional service, for example, banking, stock trading, a certificate service or a credit card service, and personal information related to the applet such as a bank account number, an encryption key value and a Personal Identification Number (PIN).

In greater detail, if the requested OTA data is a first type of OTA data, the OTA server may create a first type of encrypted OTA data by encrypting the first type of OTA data using a first type of OTA key. Accordingly, the OTA server may create a message including the first type of encrypted OTA data.

If the requested OTA data is a second type of OTA data, the OTA server may create a second type of encrypted OTA data by encrypting the second type of OTA data using a second type of OTA key. Accordingly, the OTA server may create a message including the second type of encrypted OTA data.

In this case, when creating a message including the second type of encrypted OTA data, the OTA server may opt not to include the second type of primarily encrypted OTA data in a message, but may secondarily encrypt the second type of primarily encrypted OTA data using the first type of OTA key and then create a message including the second type of secondarily encrypted OTA data.

Thereafter, the OTA server may send the created message to the message center at step S230. The message center may send the message to the mobile terminal at step S240.

In this case, the message may be any one of a Short Message Service (SMS) message, a Long Message Service (LMS) message and a Multimedia Message Service (MMS) message.

The mobile terminal may receive the message. The mobile terminal may extract the encrypted OTA data from the received message at step S250. Accordingly, the mobile terminal may send the extracted OTA data to the smart card at step S260.

Thereafter, the smart card may receive the OTA data from the mobile terminal. The smart card decrypts the input OTA data using a preset OTA key at step S270.

As a result, the smart card may process OTA data, that is, it may install or store the OTA data in a separate region, depending on the results of the decryption at step S280. The operational principle of the smart card for installing or storing OTA data based on the results of the decryption will be described with reference to FIGS. 3 and 4.

As described above, in the present invention, various types of OTA data may be installed or stored in a single smart card in such a way as to encrypt and decrypt OTA data using preset OTA keys depending on the type of OTA data.

Figure 3:
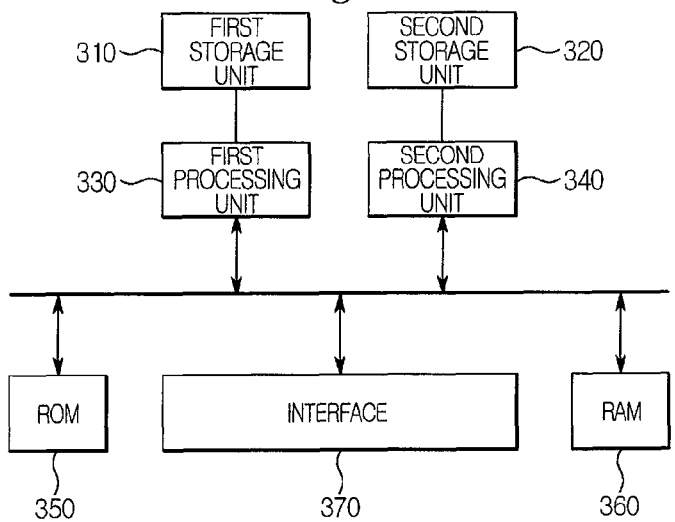
FIG. 3 is a diagram showing an example of the detailed construction of the smart card shown in FIG. 1.

FIG. 3 is a diagram showing an example of the detailed construction of the smart card shown in FIG. 1.

As shown in FIG. 3, the smart card according to the present invention may include a first storage unit 310, a second storage unit 320, a first processing unit 330, a second processing unit 340, Read Only Memory (ROM) 350, Random Access Memory (RAM) 360, and an interface 370.

The interface 370 may receive encrypted OTA data from the mobile terminal.

The ROM 350 may store an operating system and programs related thereto. The RAM 360 may be used as working space for the first processing unit 330 and the second processing unit 340.

The first processing unit 330 may receive encrypted OTA data from the mobile terminal. The first processing unit 330 may decrypt the OTA data using a first type of OTA key and extract a first type of OTA data.

Accordingly, the first processing unit 330 may process a first type of extracted OTA data, that is, it may install or store a first type of extracted OTA data in the first storage unit 310.

In contrast, if the OTA data extracted using the first type of OTA key is encrypted OTA data that cannot be processed by the first processing unit 330, the first processing unit 330 may provide the extracted OTA data to the second processing unit 340.

The second processing unit 340 may receive the encrypted OTA data from the first processing unit 330. The second processing unit 340 may decrypt the OTA data using a second type of OTA key and extract a second type of OTA data.

Accordingly, the second processing unit 340 may process a second type of extracted OTA data, that is, it may install or store the second type of extracted OTA data in the second storage unit 320.

In this case, a USIM/SIM Application Toolkit (USAT) framework may be applied to the first processing unit. A Global Platform (GP) framework may be applied to the second processing unit.

Here, the first storage unit 310 and the second storage unit 320 may be formed of respective separate areas in a single piece of Electrically Erasable and Programmable Read Only Memory (EEPROM) capable of storing OTA data, or may be formed of respective pieces of EEPROM.

As described above, since in the present invention, various types of OTA data may be installed or stored in a single smart card capable of operating in conjunction with various types of mobile terminals, improved convenience can be provided to users who use such smart cards.

Figure 4:
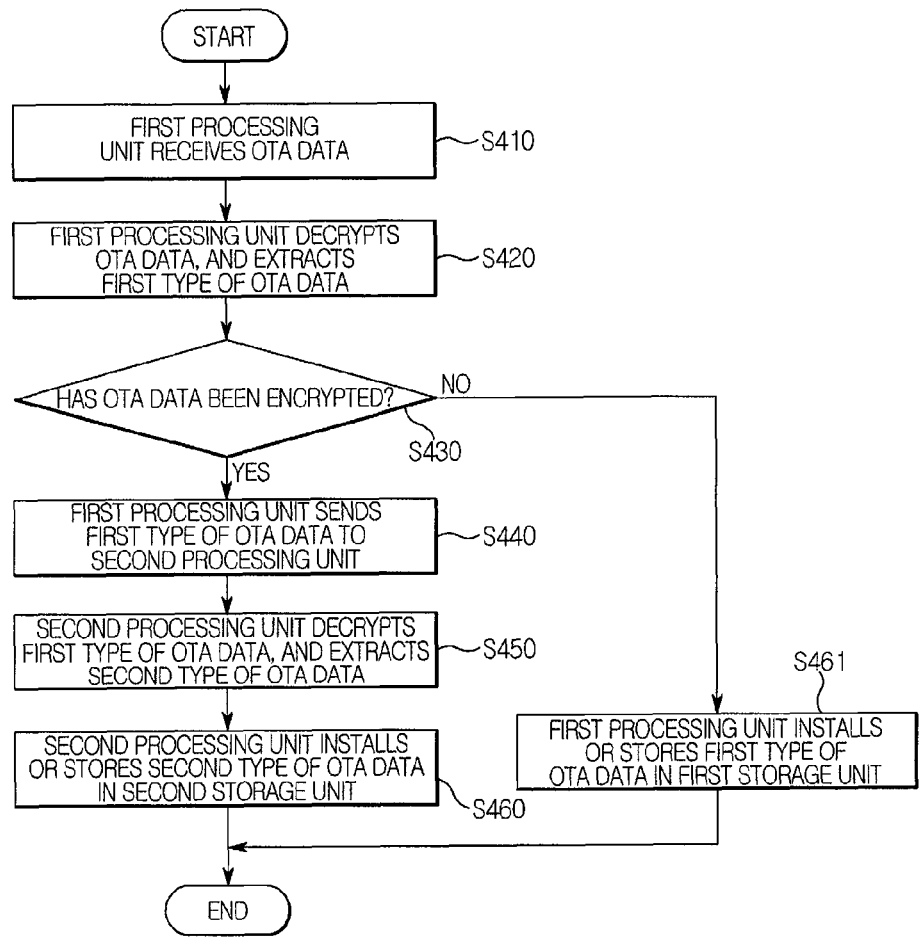
FIG. 4 is a second flowchart showing a method of providing OTA service according to an embodiment of the present invention.

FIG. 4 is a second flowchart showing a method of providing OTA service according to an embodiment of the present invention.

As shown in FIG. 4, the first processing unit may receive encrypted OTA data from the mobile terminal at step S410. The first processing unit may decrypt the encrypted OTA data using a first type of preset OTA key and extract a first type of OTA data at step S420.

The first processing unit may check whether the extracted OTA data has been encrypted at step S430. That is, since the first processing unit determines the extracted OTA data to be a first type of OTA data if the extracted OTA data has not been encrypted, the first processing unit may install or store the extracted OTA data in the first storage unit at step S461.

In contrast, since the first processing unit determines the extracted OTA data to be a second type of OTA data if the extracted OTA data has been encrypted, the first processing unit may send the extracted OTA data to the second processing unit at step S440.

The second processing unit may receive OTA data from the first processing unit. The second processing unit may decrypt the input OTA data using a second type of preset OTA key and extract a second type of OTA data at step S450.

As a result, the second processing unit may install or store a second type of extracted OTA data in the second storage unit at step S460.

The reason for this is to enable the first processing unit to access the OTA data using the first type of OTA key and enable the second processing unit to access the OTA data using the second type of OTA key.

As described above, in the present invention, OTA data is encrypted and decrypted using preset OTA keys, that is, the first type of OTA key and the second type of OTA key, and thus processing rights for various types of OTA data can be distinctively granted through the above-described procedure.

The system and method for providing OTA service according to the present invention may be varied and modified within the scope of the technical spirit of the present invention, and is not limited to the above-described embodiments. Furthermore, the above embodiments and drawings are intended to describe the content of the present invention in detail, but are not intended to limit the range of the technical spirit of the present invention. Since it will be apparent to those skilled in that art that various substitutions, variations and modifications of the present invention are possible within the scope of the technical spirit of the present invention, the present invention is not limited to the above-described embodiments and the attached drawings. The range of the rights of the present invention should be appreciated on the basis of the range of equivalents to the present invention, as well as the following claims.

The invention claimed is:

1. A system for providing Over-The-Air (OTA) service, comprising:
   an OTA server including at least one hardware processor which is configured to:
   (1) receive a request for OTA data from a mobile terminal,
   (2) determine whether the requested OTA data is a first type of OTA data or a second type of OTA data,
   (3) if the requested OTA data is the first type of OTA data, (i) encrypt the first type of OTA data using a first type of OTA key, and (ii) create a message including a first type of encrypted OTA data, and
   (4) if the requested OTA data is the second type of OTA data, (i) primarily encrypt the second type of OTA data using a second type of OTA key, (ii) secondarily encrypt a second type of primarily encrypted OTA data using the first type of OTA key, and (iii) create a message including a second type of secondarily encrypted OTA data; and
   a message center configured to (i) receive the created message from the OTA server, and (ii) send the received message to the mobile terminal,
   wherein the first type of OTA data is terminal information related to the mobile terminal, and the second type of OTA data is at least one of an applet and personal information related to the applet for use of an additional service.

2. The system according to claim 1, wherein the message center is any one of a Short Message Service Center (SMSC), a Long Message Service Center (LMSC), and a Multimedia Message Service Center (MMSC).

3. The system according to claim 1, further comprising a database configured to assemble and manage at least one piece of OTA data to be installed or stored in a smart card which operates in conjunction with the mobile terminal.

4. A smart card comprising:
   a first processor configured to:
   (i) receive encrypted Over-The-Air (OTA) data from a mobile terminal,
   (ii) decrypt the received encrypted OTA data using a first type of OTA key,
   (iii) determine whether to process OTA data extracted through the decrypting operation using the first type of OTA key, based on whether the extracted OTA data has been encrypted,
   (iv) if the extracted OTA data has not been encrypted, determine the extracted OTA data as a first type of OTA data, and process the first type of extracted OTA data, and
(v) if the extracted OTA data has been encrypted,
determine the extracted OTA data as a second type of OTA data, and
send the extracted OTA data to a second processor; and
the second processor configured to:
(i) receive the extracted OTA data from the first processor,
(ii) decrypt the first type of received extracted OTA data using a second type of OTA key, and
(iii) process a second type of extracted OTA data which is extracted through the decrypting operation using the second type of OTA key,
wherein the first type of OTA data is terminal information related to the mobile terminal, and the second type of OTA data is at least one of an applet and personal information related to the applet for use of an additional service.

5. The smart card according to claim 4, wherein the first processor is configured to:
install the first type of extracted OTA data in a first memory unit of the smart card.

6. The smart card according to claim 5, wherein the second processor is configured to install the second type of extracted OTA data in a second memory unit of the smart card.

7. The smart card according to claim 4, wherein a USIM/SIM Application Toolkit (USAT) framework is applied to the first processor and a Global Platform (GP) framework is applied to the second processor.

8. The smart card according to claim 4, wherein the smart card is any one of a Subscriber Identification Module (SIM) card, a Universal Subscriber Identification Module (USIM) card, a User Identification Module (UIM) card and a Removable User Identification Module (RUIM) card, which is capable of being installed in or detachably attached to the mobile terminal.

9. A method of providing Over-The-Air (OTA) service in an OTA server including at least one hardware processor, comprising:
receiving a request for OTA data from a mobile terminal;
checking a type of the requested OTA data, wherein the checking includes determining whether the requested OTA data is a first type of OTA data or a second type of OTA data;
creating a message by encrypting the requested OTA data using a corresponding OTA key according to a data type check result; and
sending the created message to the mobile terminal through a message center,
wherein the creating the message includes:
(i) if the requested OTA data is the first type of OTA data,
encrypting the first type of OTA data using a first type of OTA key, and
creating the message including a first type of encrypted OTA data; and
(ii) if the requested OTA data is the second type of OTA data,
primarily encrypting the second type of OTA data using a second type of OTA key,
secondarily encrypting the second type of primarily encrypted OTA data using the first type of OTA key, and
creating the message including a second type of secondarily encrypted OTA data; and
wherein the first type of OTA data is terminal information related to the mobile terminal, and the second type of OTA data is at least one of an applet and personal information related to the applet for use of an additional service.

10. A method of providing Over-The-Air (OTA) service in a smart card including at least one hardware processor, comprising:
(i) receiving encrypted OTA data from a mobile terminal;
(ii) decrypting the received encrypted OTA data using a first type of OTA key;
(iii) determining whether to process OTA data extracted through the decrypting operation using the first type of OTA key, based on whether the extracted OTA data has been encrypted;
(iv) if the extracted OTA data has not been encrypted,
determining the extracted OTA data as a first type of OTA data, and
processing the first type of extracted OTA data and
(v) if the extracted OTA data has been encrypted,
determining the extracted OTA data as a second type of OTA data,
decrypting the extracted OTA data using a second type of OTA key, and
processing a second type of extracted OTA data which is extracted through the decrypting operation using the second type of OTA key,
wherein the first type of OTA data is terminal information related to the mobile terminal, and the second type of OTA data is at least one of an applet and personal information related to the applet for use of an additional service.

11. The method according to claim 5, wherein the processing the first type of extracted OTA data includes installing the first type of extracted OTA data in a first memory unit of the smart card.

12. The method according to claim 11, wherein the processing a second type of extracted OTA data includes installing the second type of extracted OTA data in a second memory unit of the smart card.

* * * * *

UNITED STATES PATENT AND TRADEMARK OFFICE
CERTIFICATE OF CORRECTION

| | |
|---|---|
| PATENT NO. | : 9,325,668 B2 |
| APPLICATION NO. | : 12/666170 |
| DATED | : April 26, 2016 |
| INVENTOR(S) | : Young Chual Park et al. |

It is certified that error appears in the above-identified patent and that said Letters Patent is hereby corrected as shown below:

In the claims

In claim 4, column 7, line 10, "first type of" should be deleted.

In claim 11, column 8, line 46, "The method according to claim 5" should be amended --The method according to claim 10--.

Signed and Sealed this
Nineteenth Day of July, 2016

Michelle K. Lee
*Director of the United States Patent and Trademark Office*